Patented Oct. 7, 1952

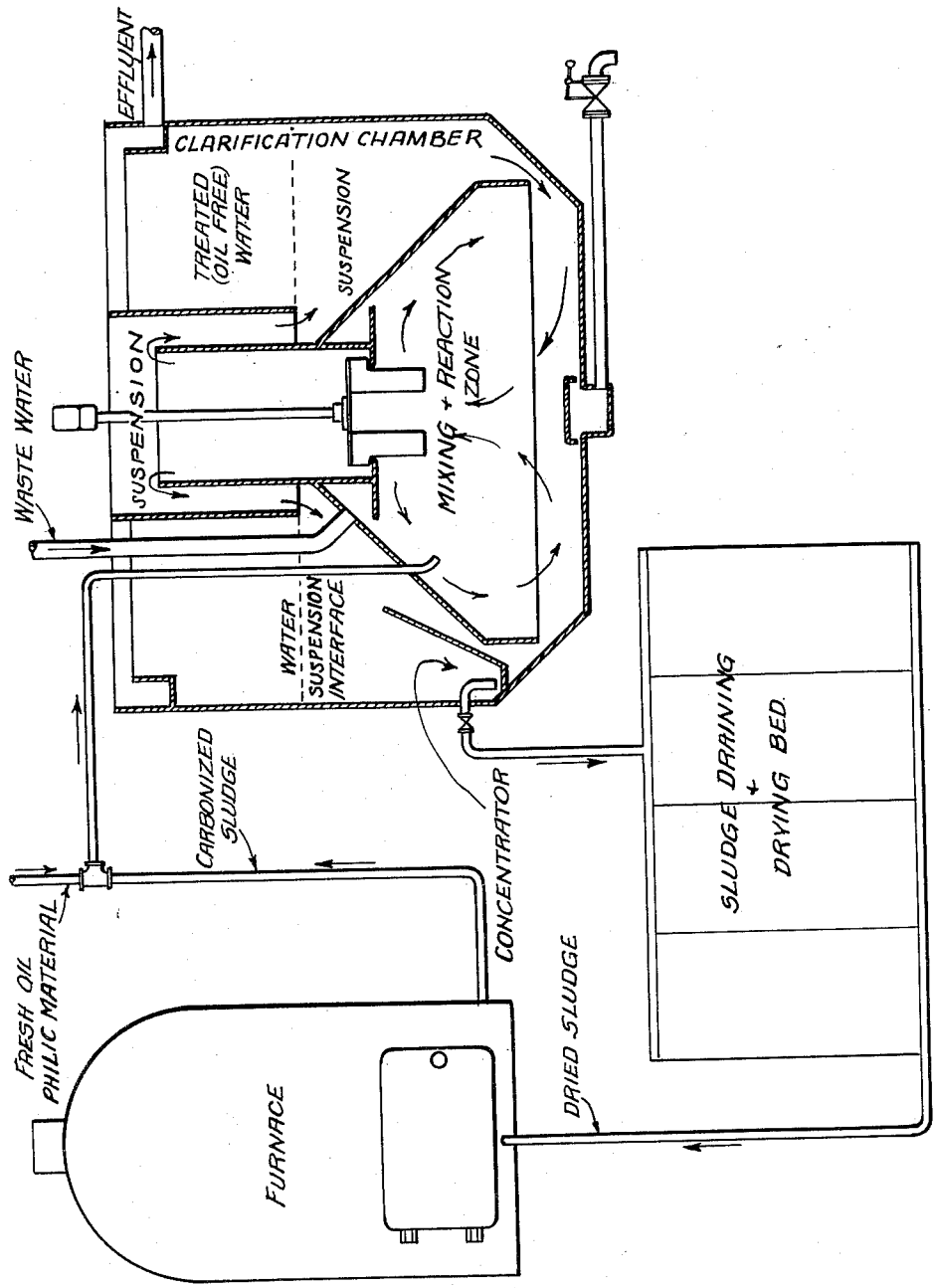

2,613,181

UNITED STATES PATENT OFFICE 2,613,181

TREATMENT OF OILY WASTE WATER

Walter H. Green, Geneva Township, Kane County, and Anton A. Kalinske, Elmhurst, Ill., assignors to Infilco Incorporated, Chicago, Ill., a corporation of Delaware Application September 13, 1947, Serial No. 773,858

4 Claims. (Cl. 210—2)

1

This invention relates to the removal of an adsorbable material, such as oil or grease from water.

In its broadest aspect the invention relates to a new process of removing adsorbable material from water by use of an adsorbent material which adsorbs the adsorbable material in preference to water.

One specific aspect of our invention is a new and improved process whereby water containing grease, oil, or other oily material, either in the form of an emulsion or in the form of a suspension, can be more readily purified by the use of materials which are philic to oil or grease in preference to water, which materials, for convenience, will generally be called "oil-philic material."

A second aspect of our invention is to so remove oily material from water that the oil polluted material discharged from the process can be easily and cheaply disposed of, and without creating a nuisance.

Another aspect of our invention is the preparation of a new oil-philic material, which can be used as a contact material for the separation of oily materials from water.

It is an object of our invention to provide a very effective and economical way for the separation of oil or grease, or an oily material, from water, particularly when a large volume of water is contaminated with relatively large amounts of oily material, such as the waste from a petroleum refining plant.

These and other objects of our invention will be apparent from the description and claims which follow.

It has long been known that a water containing minute traces of oil, grease, or other oily materials, either in the form of an emulsion or in droplets suspended in an aqueous medium, can be purified by coagulating with alum or iron, or by contact with an oil-philic material. For example, for many years condensate containing traces of oil has been treated for the removal of oil in two ways: in some cases the water has been first coagulated with alum, or some iron coagulant, and then filtered. In other cases the oily condensate was softened, as by treatment with lime or lime and soda ash, the softening precipitate adsorbing the small traces of oil present. The first method has been used mostly for condensate in surface condensers and the water softening method in barometric condensers. These methods are satisfactory where the oil content of the water is low, i. e. only a few parts per million. Where such water contained slugs of oil that would float it had to be given a preliminary treatment to remove such oil, as by holding in a basin for a period so that the oil could rise to the top of the water and be skimmed off. The amount of oil in such waters is seldom more than 10 or 15 parts per million and for removal of such minute quantities the treatment was quite satisfactory. These processes were quite expensive, due to the large amount of chemicals needed to remove such small amounts of oil. Further, it has generally been assumed that such methods of treatment were not applicable to the removal of oil from waste waters such as those coming from a petroleum refinery. In the latter instance, the amount of oil may vary from 100 to 2500 parts per million, and the character of the water may also fluctuate widely, sometimes containing large amounts of free alkali and other times large amounts of free acid, and the salt content varying widely, from time to time.

It is not generally known but some forms of calcium carbonate are good oil-philic agents, adsorbing oil or oily material in preference to water, regardless of whether the oily mixture is in the form of an emulsion or in the form of droplets of oil in the water. A particularly suitable form of calcium carbonate for such purpose is that secured as waste sludge from a water softening plant, and which may or may not contain magnesium hydroxide. However, when such treatment is used in the manner of the old art, when the oil content is large as in the case of some refinery waste, then it was found that it was practically impossible to secure an effluent having less than 40 or 50 parts per million of oil. The prior processes involved mixing the sludge and water in a mixing basin, then passing the mixture into a large quiescent sedimentation basin in which the sludge, which had adsorbed some of the oil, deposited. Such a process required large basins, a large amount of oil-philic material, and did not give satisfactory results.

The purification of such oily wastes is a double problem. It is necessary, on the one hand, to get the oil out of the waste water and, on the other hand, to dispose of the oily waste produced. In the first step, the oil is not destroyed, but after adsorption it is concentrated in a waste product. The oil removed by such material is not in a form in which it can be used or even one from which it can ordinarily be recovered in usable form by any practical means, so that there is still the question of the disposal of this oily waste material. This oily waste could be disposed of by lagooning but this requires considerable land and creates a very obnoxious nuisance, as the oily waste often contains large amounts of phenols and other malodorous compounds.

Our process is directed to several aspects of this general problem: it provides a better method for removing the oil from the waste water as it utilizes relatively small equipment to treat large volumes of water containing large amounts of oil, and to produce an effluent that can meet any desired standard of purity; it also provides as a waste product a material that can be burned, or otherwise carbonized, to remove the oil and give a final product that is inert and inoffensive; and also it provides a new and improved oil-philic material that can be reused indefinitely.

We have found, and a major aspect of our invention resides in this discovery, that if there be maintained a suitable suspension, usually a rather thick suspension, comprised of water undergoing treatment and a suitable oil-philic material, and oily waste water be continuously passed into this suspension and after a period of retention therein permitted to pass on into a separation zone where purified water escapes, that very satisfactory oil removal can be obtained. Other adsorbable material can be removed from water by the same process, using as an adsorbent a material which is philic to the adsorbable material in preference to water. We have noted also other purification benefits are had in the way of reduction of objectionable odors, improved clarity, etc. The size of the body of suspended material, or what is saying the same thing, the time of retention of the liquid being treated in the suspension, and the amount of solids kept in suspension is determined by the amount of oily waste water to be treated, the amount of oil to be removed, and the degree of purification to be secured. There is also to be considered the length of time the solids are kept in the suspension to remove oil, for the concentration of oil in the oil-philic material is important.

We have found that we can get very satisfactory and consistent oil removal from such waste water in a relatively small basin and in a short period of time by passing the oily water into and through the rather thick suspension of suitable material, as hereinafter described. We have found that the best results are secured when the apparatus used is of a type which recirculates a considerable volume of thick suspension and in which treated water escapes from such suspension at a horizontally moving interface separating the suspension and clarified water. We have also found that the separation of oil from the water is a function of the amount of solids available for such adsorption and the length of contact between the polluted water and the oil-philic material.

By using our process it was found possible to take a waste water from an oil refinery, in which the oil content varied from about 100 to about 2500 parts per million, in which the pH varied from about 2 to about 11, and in which the salt content varied over a wide range; and to bring the oil content down to not more than 20 parts per million and usually about 10 parts per million or less and to simultaneously deliver an effluent in which the pH varied from about 6 to about 9. The figure of 20 parts per million was taken as satisfactory because at this particular plant, such reduction was satisfactory to the local authorities. However, experimental work in connection with this plant showed that complete removal could be secured at a little extra expense, for with our process the amount of oil removal depends on the amount of solids in suspension and the length of retention in the mixing zone. In this case we found that best results are secured when the suspension contained about 20 to 25 percent solids, by volume (this being measured by settling the suspension for a period of 5 minutes and noting the proportion between the volume of solids settled and the original suspension). The solid separated from the treatment were very oily, and contained about 50 to about 75 percent oil, by weight.

In this treatment, as noted, best results were secured when the suspensions contained about 20 to 25 percent solids by volume. It was found possible to keep such an amount of solids in suspension, and for a period long enough to take up an amount of oil exceeding the weight of the particles used, sometimes up to as high as 125 percent. In the particular instances referred to, the solids originally used for oil removal were the sludge discharged from an adjacent water softening plant, which consisted mainly of finely divided calcium carbonate. This had the advantage that the materials used for the oil removal treatment cost nothing other than the cost of pumping it a short distance, thus avoiding the old defect of excessive cost of treatment. However, other materials can be used, as several oil-philic materials are known, and in fact we for a time used lime and iron but this was more costly.

In our process, when using softener sludge as the oil-philic material, the removal of oil is not affected directly by variation in pH in the raw water. When the pH is as low as 2 there obviously is a large amount of free acid present— in most cases free sulfuric acid. When, as in this case, the material used for adsorption of the oily material contained a large proportion of calcium carbonate, this served to neutralize the acid and the effluent from the apparatus seldom, if ever, had a pH as low as 6. One advantage of this process, when using a material as outlined, is this ability to neutralize the acid. Of course when this occurred some of the calcium carbonate was dissolved. This did not adversely affect operating results as we used such a thick suspension that the dissolving of a part of it didn't affect the final result. However, with such a reaction there is the liberation of a quantity of carbon dioxide and care must be taken to provide for its escape in a manner to avoid interfering with the clarification of the water. With our process and our preferred form of apparatus, we have found that even though carbon dioxide is liberated, it readily escapes from the liquid and does not interfere with the treatment. This is not true of treatment by prior methods, as in the old mixing and sedimentation process it quite often happened that the carbon dioxide became attached to the solid particles and caused them to float, thus interfering with proper separation.

In our process there is a continual entry of oil polluted water into the suspension, a continual adsorption of oil on the particles in suspension and a continual escape of treated (oil free) water. We found certain practical advantages in limiting the percentage of oil taken up by the solids, so that it is obvious that there must be a more or less continuous addition of new solids to and removal of old solids from the suspension. The addition can be effected by the continuous discharge of a thick suspension of suitable oil-philic material from some suitable feeding vessel into the water undergoing treatment. Such addition can be actually continuous or intermittent but at sufficiently frequent intervals as to keep the suspension in the proper condition. The removal of the oil bearing solids from the suspension can be by any one of several well known methods, such as the use of a concentrator, as is illustrated in the patent to Green, No. 2,368,354, or part of the solids can be withdrawn to settle, and the liquid returned, or part of the unconcentrated suspension can be discharged to waste.

As noted above, we found that very good operating results were secured when the concentration of oil to solids in the solids discharged was between about 50 to about 75 percent, by weight. Such material, having such a high oil content, is burnable after a short draining and drying. We have found that the sludge discharged can be dewatered to the consistency of axle grease in a few hours on a suitable drainage bed, and in a few hours more will be sufficiently dry to support combustion. The burnt material is inert and innocuous, and so creates no major disposal problem.

We have further found that if the resulting oily sludge is carbonized, by burning or coking as in a retort, the final material can be reused as adsorbent material, with some advantage to be derived therefrom. In most instances it will be desired to burn the material substantially as soon as it is dry enough to do so, a matter of 6 or 8 hours drying, perhaps. At this stage the material carbonizes, or burns, quite readily and freely although, due to the moisture contained therein, it burns at relatively low temperatures. If preferred, the material can also be heated in a retort or coking furnace, the gases being used to support the necessary combustion. Regardless of the form of carbonizing there will be a considerable amount of free carbon left in the waste sludge. Carbon is also oil-philic, so that the burned material takes up the oil fully as well, if not better, than the original calcium carbonate sludge. It also has the advantage that it has a deodorizing effect on the water, which is often odorous and objectionable. The more porous carbon obtained by coking is of course better for odor removal than is the less porous material secured by burning.

Perhaps our invention and method will be understood most easily from a reference to the drawing, which represents a flow diagram of our cyclic process, the treating apparatus itself being shown in cross section in order to show the zones, or spaces, contained therein. This apparatus is of well known construction, being sold under the trade name "Accelator." The apparatus, therefore, does not form a part of our invention, although the process carried out therein is believed to be novel and patentable.

It can be noted here that our process can be used to remove any adsorbable material from a water contaminated therewith, and in its broader aspects our invention is so directed. However, for purposes of illustration, we so far have referred to, and hereafter chiefly will refer to, one particular installation which happened to be a petroleum refinery and in which our process was used to remove oily material from the plant waste water. In order to remove other materials it might be necessary to use other adsorbents than here mentioned, but the process remains the same.

The right hand part of the figure shows a cross-section of a preferred form of a treating apparatus for use in conjunction with our invention. It will be understood, however, that other forms of liquid treating apparatus which can provide agitation and mixing of the water to be purified and philic material in and with a thick suspension (containing as much as 20 to 25 percent, or sometimes more, solids by volume), and avoid sedimentation of such particles while used in the treatment of waste water, can be used in our process.

It is obvious that in this process a considerable amount of solids is involved. As indicated above it is desirable to maintain a suspension containing 20 to 25 percent by volume of solids. A large amount of solids is fed continuously into the apparatus and must, therefore, be continuously removed therefrom. It will be noted that when we speak of a 20 percent suspension we do not mean that an amount of suspension equal to 20 percent of the water to be treated is added to the basin, but that the circulating suspension in the mixing and reaction zone and the lower part of the clarification chamber has a concentration of 20 percent solids, by volume.

In carrying out our process in such an apparatus, the oily waste water is introduced into a large volume of rather thick suspension of oil-philic material in water undergoing treatment, which suspension is maintained in the mixing and reaction zone and the lower part of a clarification chamber. The volume of such suspension is several times that of the water entering to be treated per minute. The suspension is circulated continuously, and rather rapidly, throughout the mixing and reaction zone, whereby the oil in the waste water is agitated in and with the oil-philic material. The fresh oil-philic material also is introduced into the mixing and reaction zone, so that the oily water is mixed with both the new oil-philic material and that contained in the thick suspension, the circulation of the latter being sufficient to avoid sedimentation of the particles therefrom. A portion of such mixture, after treatment in the mixing zone sufficient to provide for the desired degree of oil adsorption by the suspended material, is passed into the lower portion of the clarification chamber. The suspension fills the lower part of such chamber and the upper part is filled with oil-free, or treated, water, the suspension and the treated water being separated by an interface through which the treated water escapes from the suspension. Solids left behind by the escape of oil-free water are retained in the suspension. Preferably excess solids are collected in a concentrator, from which they are withdrawn substantially continuously.

The process just described was used at the oil refinery mentioned, and will be better understood from a consideration of the type of water to be treated, and the results secured. The flow to be treated at this refinery was waste water from the entire plant, and had a volume of several million gallons per day. This was first passed through a large skimming tank where a considerable amount of oil floated up and was recovered. The effluent from this tank contained from a minimum of slightly over 100 parts per million to a maximum of over 2400 parts per million, with an average of about 300 parts per million of oil. This effluent also varied in pH over a range of from 2 to 11, due to periodic discharges of acid and caustic. The temperature varied, and often quite rapidly, over a range of about 30 degrees. The turbidity of the raw water often varied considerably although this seemed to have no apparent effect on the removal of oil from the water.

At the refinery where this work was carried out it was estimated that about 90 percent of the water contained only oil and insoluble solids. The remaining 10 percent was made up of various streams containing phenols, sulfides, mercaptans, and varying amounts of sulfuric acid and caustic soda. However these minor streams were not regular flows, which would give a water of substantially constant characteristics, but were dumped in batches into the receiving sewer, thereby giving a liquor of widely fluctuating characteristics. These fluctuations create a difficulty of considerable magnitude, and one with which prior processes were unable to cope. However our process was sufficient at all times to give a satisfactory effluent.

Results consistently showed an oil content in the treated water of less than 20 parts per million (this being the mark set to be attained by various authorities), and usually well under this figure. Results depended upon the amounts of solids in the suspension, the length of detention in the process, and the other factors herein mentioned. Many tests showed an oil content of only two or less parts per million.

At the above mentioned refinery we were expected to treat water which had variations in pH of from 2.0 to 11, and it was an unusual day which did not find the pH down at least once to the range of 2 to 3. This variation in the character of the water upsets many treating processes. However, in our process with the large quantity of solids (which contained a large amount of calcium carbonate) such flash periods of high acidities do not adversely affect operation, and substantially all of the oil was removed at all times. This is because the acid may react with the calcium carbonate, or calcium hydroxide, to form neutral salts. So long as the acid run does not continue for such a long period as to dissolve too great a proportion of the sludge, our process continues to operate and to deliver an effluent that is quite uniform and stable. Our process does not reduce, to any appreciable extent, the pH when it is on the alkaline side although there may be a slight reduction. Obviously the amount of oil-philic material added to the slurry (in this example water softening sludge) must be controlled by the quantity of oil to be removed. In addition to this real, or basic, control based upon the amount of oil to be removed, there should be an additional or supplemental quantity to correct acid conditions, if necessary. Thus, for best results, we have found that the feed of contact material to the apparatus should be controlled also in relation to the pH of the incoming waste water—more material being fed to the apparatus when the pH is lower. This can be done manually, but preferably will be done automatically by using a pH meter in the water inlet line and utilizing this to control the feed of contact material into the apparatus. Where the oil adsorbing material is not itself alkaline, as calcium carbonate is, and even in some cases where an alkaline adsorbent is used, it will be found useful to use calcium hydrate or oxide to neutralize the acid and this may be fed intermittently as during periods of low pH.

The completeness of oil removal did not depend upon the oil content of the inflow but upon the quantity and characteristics of the solids in the suspension. That is, regardless of the amount of oily material in the incoming liquid, our process and oil-philic material gave an effluent of substantially constant characteristics. The determining factor in oil removal was the quantity and characteristics of the suspended solids, and under our process, as we have a large amount of solids present at all times, conditions were not readily upset.

We have operated using only calcium carbonate sludge from a water softening plant and secured very good results. Such sludge can be introduced into the mixing and reaction zone by any suitable means. We have found however, that the use of the water softening sludge alone has certain drawbacks in certain types of water: it does not always remove turbidity to a sufficient extent, and when the water is strongly acid, as often occurs, the acid reacts with the calcium carbonate, which reaction causes a reduction in the amount of oil-philic material available for oil adsorption, and the formation of carbon dioxide, which in some forms of apparatus might result in some of the solid particles floating rather than sinking. We therefore prefer to add such an amount of calcium hydroxide as may be necessary to neutralize the acid in the waste water, as it reacts with the acid more readily than the carbonate. Also, the reaction between calcium hydroxide and the acid does not produce $CO_2$ gas, and seems to aid in clarification of the final effluent. The addition of the calcium hydroxide is advantageous primarily for pH control, rather than for oil removal, although the addition of a slight excess does not interfere with the adsorption of oil by the oil-philic material.

We have found that, generally speaking, when using our process and preferred form of apparatus, the formation of carbon dioxide does not become objectionable as it did prior to the discovery of our process. However, it is obvious that the oily calcium carbonate particles, which are two-thirds calcium carbonate and one-third oil when the oil is 50 percent of the sludge, are much lighter than calcium carbonate alone and would be therefore quite apt to float if carbon dioxide became entrained therewith. However by circulating the suspension to the liquor surface and then returning it downwardly into the clarification chamber, the carbon dioxide is given a chance to escape from the suspension and the particles do not float in the clarification chamber.

There is a practical limit to the amount of oil that can be adsorbed by calcium carbonate sludge. While we have operated with an amount of oil equal to 125 percent of the weight of the dry solids (approximately 5 parts of oil, by weight, to 4 parts of sludge solids, by weight) we generally prefer to operate with a percentage of oil to solids of about 50 percent, or a little more (within the range of about 40 to about 70 percent)—that is, we prefer to remove the solids from the suspension when the ratio of oil to solids is about one to two, by weight. This necessitates the removal of considerable quantities of solids and these we prefer to remove through a concentrator.

Where the water has been freed from oil in the manner above described the problem is only partially solved as the waste sludge removed through the concentrator is of high oil content. As large volumes of such sludge are discharged every day, this leaves a disposal problem of considerable magnitude. Further, the oily sludge is often malodorous and it is therefore desirable to dispose of it in such a way as to prevent it from becoming a nuisance. When removed from the concentrator, under our preferred method of operation, this material will be quite thick—just thin enough to flow readily. If this material, or oily sludge, is allowed to stand for a short period much of the water will drain out and the material may be the consistency of axle grease but there is still too much moisture entrained to permit ready burning. However, the material can be spread out in a thin sheet of three or four inches in thickness, as on a draining bed, and if this is done the material will dry sufficiently to be burned. On a bright or warm day six or eight hours dries this oily sludge sufficiently to permit it to burn very readily, and it can be burned in the open or in a furnace, or coked in a retort. If desired the carbonized residue, which is primarily the calcium carbonate sludge with a greater or lesser amount of free carbon thereon, can be dumped without creating a nuisance.

However the carbonized material is in itself a highly effective oil-philic agent for the removal of oil from water. Ordinarily or initially it is predominantly calcium carbonate, although, depending upon the temperature reached in the burning space, some may be calcined to the hydroxide. However, as explained above, a mixture of calcium hydroxide and the calcium carbonate softener sludge is seldom objectionable and often is desirable, so that is no objection to the carbonizing at temperatures which would result in calcining some of the calcium carbonate to lime. Further, as a result of its carbonizing, a relatively large amount of free carbon is left as a residue adhering to or mixed with the calcium particles. Carbon in itself is an oil-philic reagent and assists in the removal of oil from water. Also, the carbon has the faculty of adsorbing ordors from the liquid so that the effluent discharge from treatment with such a material will be less objectionable than otherwise, and may even be satisfactory for discharge into a relatively small water course. Thus the burnt or coked sludge may be ground, or otherwise prepared, and reused in the process as the adsorbing material, and this is contemplated as part of our process and invention. With repeated reuse and reburning the amount or proportion of carbon tends to increase and this soon provides sufficient adsorbent material by itself.

Depending on the manner of burning or coking the waste this residue of carbon or carbonaceous material may be very porous and so capable of adsorbing so much oil or other material as to become so light as to tend to float. In such case it can be weighted either by addition of heavier material to the suspension or to the waste sludge, in the latter case preferably by mixture before burning.

It will be obvious that if instead of burning this material in the open it is burned in a furnace much greater control can be had as the feed or air can be accurately controlled. This provides a more uniform product and one which can have better reactive characteristics as the amount of carbon thereon can be accurately controlled. Whether or not a furnace is used in the burning of this material is entirely a question of the economics of each individual job and it may or may not be used as conditions warrant.

Also as indicated before, instead of burning in a furnace the material can be fed into a retort and heated. This drives off the volatile matter, which has high heat values, and which in fact can be used for firing the retort. Such a process has the effect of coking the carbon in the oily waste material, and giving a harder and in many respects a better product for removal of oil and odors from further water. Again, whether or not the material is so treated is immaterial for the purposes of our invention— the important thing is that the waste can be carbonized by burning or coking to produce a valuable material or at least one that can be dumped without offense.

We have found that our method of treating oily water with a contact material that is oil-philic is more efficient than methods heretofore used, even when using known materials. We have found that we not only can remove oil with less amounts of such material than heretofore thought necessary, but that we can do it in a much smaller apparatus and in a much shorter period of time, and still secure much more complete oil removal than heretofore while also having a higher oil content in the waste. We secure our improved results through introduction of the oily waste water into the very thick suspension of contact particles. By maintaining the rapid mixing and rather turbulent agitation which we contemplate each particle will come in contact with more oil so that more oil can be removed by each particle. A further advantage of our process is that the wasted material contains a much greater proportion of oil than heretofore possible. This has two advantages: first the material can be burned and reused with advantageous results; or if the material is to be dumped, or otherwise disposed of, the amount of material to be wasted is much less than heretofore, and after burning it is inert and unobnoxious.

Thus one feature of our invention relates to an improved method of contacting an oil-philic material with oily waste water in order to more efficiently remove the oil from the water.

Further, the process is valuable, also, in that it produces an inert and unobnoxious waste material and thus avoids the usual problem of disposing of the waste sludge. The process is, or can be, cyclic in that the final waste material is an improved oil-philic material and can be reused in such a process. Our investigation showed that even when using known materials we were able to secure much more rapid and complete removal of the oil from the water than heretofore thought possible. We also found that by using heretofore unknown materials, or a mixture of these new material with those previously used, we were enabled to further improve operating results.

It is to be understood that while we have described our process in connection with the removal of mineral oil from water it is not so limited for it is useful for the removal of other adsorbable materials by use of a suitable adsorbent or philic material. The process applies equally well to the removal of vegetable oils, saturated or unsaturated oils, and the like. The process is also practical for the removal of polluting compounds from chemical wastes, for example the removal of phenol by use of our carbonated sludge or activated carbon. Our process has also proven practical with other oil-philic materials. At one petroleum plant there was produced an impure aluminum chloride. This waste aluminum chloride and lime, used in our process, proved highly efficient in the removal of oils from the waste water of this plant.

We claim:

1. A process of removing adsorbable impurities from a liquid contaminated therewith comprising the steps of maintaining a concentrated suspension of solid particles of calcium carbonate, said suspension containing at least about 20 percent solids, by volume, continually supplying to said suspension new calcium carbonate particles, introducing liquid to be treated into said suspension and retaining it therein for a period of time, applying mechanical energy to maintain a circulation of, and to mix new calcium carbonate particles and liquid to be treated with, said suspension, separating treated liquid from said circulating suspension after said period of time, and removing contaminated particles of calcium carbonate from said suspension after a period of retention therein longer than the period of retention of the liquid and at the rate of addition of new calcium carbonate particles thereto.

2. A process of separating oily material from waste water containing same comprising establishing a suspension of solid particles of calcium carbonate in water undergoing treatment, maintaining in said suspension a circulation through a closed cycle path including a mixing zone and a relatively quiescent zone, passing oily waste water to be treated into said circulating suspension in said mixing zone, separating treated waste water from said circulating suspension in said relatively quiescent zone and withdrawing it from the process, retaining the calcium carbonate particles left behind by the treated waste water in said suspension until the ratio of oil adsorbed to solids is about one to two, by weight, then withdrawing oil contaminated particles to waste, and adding new calcium carbonate particles to said circulating suspension.

3. A process of separating oil from an oily waste water wherein the water to be treated and calcium carbonate are introduced into a treating zone and mixed therein, and treated water is separated from the calcium carbonate, characterized by introducing said waste water and calcium carbonate into a thick suspension of calcium carbonate in waste water undergoing treatment in said treating zone, said calcium carbonate being accumulated in said treating zone from previously treated waste water and held in suspension in the waste water undergoing treatment in said treating zone by continuous agitation, retaining the calcium carbonate in said suspension until its oil content is at least 40 percent, by weight, and withdrawing oil contaminated calcium carbonate from said suspension at the rate of addition of fresh calcium carbonate thereto.

4. A cyclic process of separating oily material from oily waste water which comprises maintaining a body of water undergoing treatment, said body of water being functionally divided into a lower mixing zone containing a thick suspension of oil-philic material and a superposed quiescent treated water zone, said suspension containing about twenty percent solids, by volume, and the oil-philic material being predominantly water softener sludge and affixed free carbon, continuously passing entering oily waste water into said thick suspension, continuously passing additional oil-philic material into said suspension, continuously agitating the contents of said lower mixing zone so that the newly entering waste water and the oil-philic material are mixed through, and incorporated in, the thick suspension, whereby the oily content of the water is removed by and retained with the oil-philic material, withdrawing treated water from the upper surface of said thick suspension into said treated water zone, retaining said water softener sludge in said thick suspension until the oil content thereof is at least about forty percent of the weight of the dry sludge and then withdrawing from said suspension an amount of sludge equivalent to the amount of oil-philic material newly introduced thereinto, drying the withdrawn material so removed from the thick suspension, carbonizing the oil content of said dried material, and returning the oil-philic material to the thick suspension for treatment of additional quantities of oily water.

WALTER H. GREEN.
ANTON A. KALINSKE.

REFERENCES CITED

The following references are of record in the file of this patent:

UNITED STATES PATENTS

| Number | Name | Date |
| --- | --- | --- |
| 650,216 | Bachman | May 22, 1900 |
| 705,253 | Krause | July 22, 1902 |
| 729,775 | Krause | June 2, 1903 |
| 1,484,167 | Allen | Feb. 19, 1924 |
| 1,687,314 | Robinson | Oct. 9, 1928 |
| 1,972,454 | Manley et al. | Sept. 4, 1934 |
| 2,294,697 | Seip | Sept. 1, 1942 |
| 2,303,588 | Stenzel | Dec. 1, 1942 |
| 2,348,122 | Green | May 2, 1944 |
| 2,355,069 | Green | Aug. 8, 1944 |
| 2,364,023 | Green | Nov. 28, 1944 |
| 2,367,384 | Tymstra | Jan. 16, 1945 |
| 2,442,809 | Hallier et al. | June 8, 1948 |
| 2,464,204 | Baker | Mar. 15, 1949 |
| 2,468,188 | Frankenhofb | Aug. 26, 1949 |
| 2,501,977 | Wallerstedt et al. | Mar. 28, 1950 |

OTHER REFERENCES

Cox, Laboratory Control of Water Purification, pp. 283, 284, Case-Sheppard-Mann Publishing Co. (1946).

Keefer, Sewage Treatment Works, pp. 138–141, 352–3, McGraw-Hill (1940).